United States Patent
Gauch et al.

(10) Patent No.: US 9,845,197 B2
(45) Date of Patent: Dec. 19, 2017

(54) MAGNETIC LIFTING DEVICE FOR CAN BODIES

(71) Applicant: Soudronic AG, Bergdietikon (CH)

(72) Inventors: Pascal Gauch, Berikon (CH); Peter Taiana, Widen (CH)

(73) Assignee: Soudronic AG, Bergdietikon (CH)

(*) Notice: Subject to any disclaimer, the term of this patent is extended or adjusted under 35 U.S.C. 154(b) by 0 days.

(21) Appl. No.: 15/300,924

(22) PCT Filed: Feb. 26, 2015

(86) PCT No.: PCT/CH2015/000029
§ 371 (c)(1),
(2) Date: Sep. 30, 2016

(87) PCT Pub. No.: WO2015/168811
PCT Pub. Date: Nov. 12, 2015

(65) Prior Publication Data
US 2017/0022011 A1    Jan. 26, 2017

(30) Foreign Application Priority Data
May 5, 2014    (CH) ...................................... 0666/14

(51) Int. Cl.
*B65G 15/58*    (2006.01)
*B65G 47/24*    (2006.01)
(Continued)

(52) U.S. Cl.
CPC ........... *B65G 15/58* (2013.01); *B65G 15/105* (2013.01); *B65G 21/2009* (2013.01);
(Continued)

(58) Field of Classification Search
CPC .............. B65G 21/2018; B65G 47/252; B65G 15/105; B65G 15/58; B65G 47/24;
(Continued)

(56) References Cited

U.S. PATENT DOCUMENTS 3,656,234 A * 4/1972 Regan ..................... B26B 19/40
15/104.93
4,235,187 A * 11/1980 Mirza ....................... B05C 7/00
118/423
(Continued)

FOREIGN PATENT DOCUMENTS

| CH | 706 991 A1 | 3/2014 |
| NL | 6 902 464 A | 8/1970 |
| WO | 2014/043821 A1 | 3/2014 |

OTHER PUBLICATIONS

International Search Report of PCT/CH2015/000029, dated May 19, 2015.

*Primary Examiner* — Mark A Deuble
(74) *Attorney, Agent, or Firm* — Collard & Roe, P.C.

(57) ABSTRACT

A magnetic lifting device for bodies (Z) comprises an input transport device (10) for transporting lying bodies (4), a transport device (12) for transporting lifted bodies (9) hanging at the transport device (12) and arranged above the input transport device (10) and a control device (13). A first magnet arrangement (1) which is activated and deactivated by the control device (13) is arranged below the input transport device (10) in such a way that a body (4) lying on the input transport device (10) is magnetically held in a releasable way on the input transport device (10). A second magnet arrangement (2) is arranged above an area of the input transport device (10), in which the bodies are transported, and is formed in such a way that a body lying on the input transport device (10) is lifted by the magnetic field of the second magnet arrangement (10) when the magnetic field of the first magnet arrangement (1) is deactivated. A third magnet arrangement (3) is provided above the transport device (12) and is formed and arranged in such a way that a partially lifted body (4a) is lifted more and is lifted off the input transport device (10) and is transported in an upright (Continued)

position hanging magnetically at the transport device (12). The control device (13) is adapted to activate the first magnet arrangement (1) when a front edge of a body (4) lying on the input transport device (10) has passed the second magnet arrangement (2) and to deactivate the first magnet arrangement (1) when a trailing edge of this body (4) comes to lie below the second magnet arrangement (2).

12 Claims, 2 Drawing Sheets

(51) Int. Cl.
| | |
|---|---|
| *B65G 47/36* | (2006.01) |
| *B65G 47/244* | (2006.01) |
| *B65G 21/20* | (2006.01) |
| *B65G 47/252* | (2006.01) |
| *B65G 15/10* | (2006.01) |

(52) U.S. Cl.
CPC ......... *B65G 21/2018* (2013.01); *B65G 47/24* (2013.01); *B65G 47/2445* (2013.01); *B65G 47/252* (2013.01); *B65G 47/36* (2013.01); *B65G 2201/0252* (2013.01)

(58) Field of Classification Search
CPC ............ B65G 47/36; B65G 2201/0252; B65G 21/2009; B65G 47/244; B65G 47/2445
See application file for complete search history.

(56) References Cited

U.S. PATENT DOCUMENTS 4,618,052 A * 10/1986 Rickett .............. B65G 21/2018
 198/370.13
5,788,049 A * 8/1998 Ardison ................ B65G 47/252
 198/408

* cited by examiner

MAGNETIC LIFTING DEVICE FOR CAN BODIES

REFERENCE TO RELATED DOCUMENTS

This application is the National Stage of PCT/CH2015/000029 filed on Feb. 26, 2015, which claims the priority under 35 U.S.C. §119 of Swiss patent application No. 0666/14, filed on May 5, 2014, whose complete content is included by reference. The international application under PCT article 21(2) was not published in English.

TECHNICAL FIELD

The invention relates to a magnetic body lifting device and a device for manufacturing cans with such a body lifting device according to the independent claims.

BACKGROUND ART

During the manufacturing of can bodies, after the body has left the welding machine, it is directly further processed or the applied seam cover is burned in. For subsequent operations the lying body is normally brought into the standing, vertical position. Body lifting device are known, which accomplish this by means of a magnetic field. In these cases lifting is normally carried out about the front edge of the body, such that the rear section of the body moves upward. Known magnetic body lifting devices work with magnetic cases arranged on both sides of the transport path of the body.

An example for such a lifting device is a magnetic body lifting device of the company O. S. Walker Magnetics, USA. With this body lifting device the body is lifted about its front edge or the front edge is rotated or tilted, respectively, such that the body is lifted by its rear section. By arranging magnet elements, which consist of individual magnets arranged inside a closed case, one after the other, a magnetic field corresponding to a single large magnet is generated. By using two magnet cases on both sides of the transport path of the bodies, the body is centered, such that the risk of scratches on the body paint is reduced. This solution works for various body diameters and heights and is therefore a universal solution in case the bodies are lifted by their rear sections.

A further magnetic body lifting device is known from the company NSM Magnettechnik GmbH, Germany and is intended for dedicated manufacturing lines in case of which the body height and the body diameter are substantially predefined. This body lifter works with few magnets which are combined as individual magnet bars arranged in a special way, being arranged in closed magnet cases on both sides of the transport path of the bodies in a precisely specified position. The arrangement of the magnet bars is designed in such a way that this body lifter is built either for lifting via the front edge of the body or for lifting via the trailing edge of the body.

A further body lifting device is disclosed in patent application CH 706 991 A1. This device also uses magnet cases, like the already mentioned devices, which are arranged on both sides of the transport path of the bodies.

Usage of magnet cases on the side of the transport path produce a number of more or less pronounced disadvantages. One disadvantage consists in the fact that an increased risk of contact between the magnet cases and the transported bodies exists, potentially leading to damage of the bodies. Furthermore, such magnet cases may be difficult to mount and to adjust. In this context they have the disadvantage that free viewing of the interior of the device is blocked by their position, such that access to the device is made difficult. Furthermore, the trajectory or the lifting process, respectively, of the bodies cannot be supervised or can only be supervised hardly, such that later adjustments of the device are complicated.

DISCLOSURE OF THE INVENTION

Hence, it is an object of the invention to provide a magnetic lifting device for can bodies, which provides remedy for said disadvantages.

This object is reached by a lifting device for bodies according to the invention. The magnetic lifting device for bodies comprises an input transport device for transporting lying bodies, a transport device for transporting lifted bodies hanging at the transport device and arranged above the input transport device and a control device. A first magnet arrangement which is activated and deactivated by the control device is arranged below the input transport device in such a way that a body lying on the input transport device is magnetically held in a releasable way on the input transport device. A second magnet arrangement is arranged above an area of the input transport device, in which the bodies are transported, and is formed in such a way that a body lying on the input transport device is lifted by the magnetic field of the second magnet arrangement when the magnetic field of the first magnet arrangement is deactivated. A third magnet arrangement is provided above the transport device and is formed and arranged in such a way that a partially lifted body is lifted more and is lifted off the input transport device and is transported in an upright position hanging magnetically at the transport device. The control device is adapted to activate the first magnet arrangement when a front edge of a body lying on the input transport device has passed the second magnet arrangement and to deactivate the first magnet arrangement when a trailing edge of this body comes to lie below the second magnet arrangement.

Furthermore the object is reached by a device for manufacturing can bodies with at least a magnetic lifting device according to the respective claims.

The lifting device for bodies has the advantage that no magnet cases are required on the sides of the input transport device, which on the one hand are more complex with respect to their construction, and are therefore more expensive, and on the other hand cover the view into the lifting space because of their position. Hence, the body lifting device according to the invention is cheaper regarding manufacturing and it can be better supervised or adjusted, or readjusted, respectively, with respect to the "flight trajectory" of the bodies between their lying position and their lifted (standing) position. A further advantage consists in that the risk of damaging the bodies by potential contact with lateral magnet cases is avoided.

The body lifting device according to the invention can be used for lifting bodies with regular dimensions, but particularly also for bodies with a length to diameter ratio of 3 to 1.

BRIEF DESCRIPTION OF THE DRAWINGS

Further embodiments, advantages and applications of the invention will become apparent when consideration is given to the dependent claims and the annexed drawings, wherein:

MODES FOR CARRYING OUT THE INVENTION

Notes and Definitions

Figure 1:
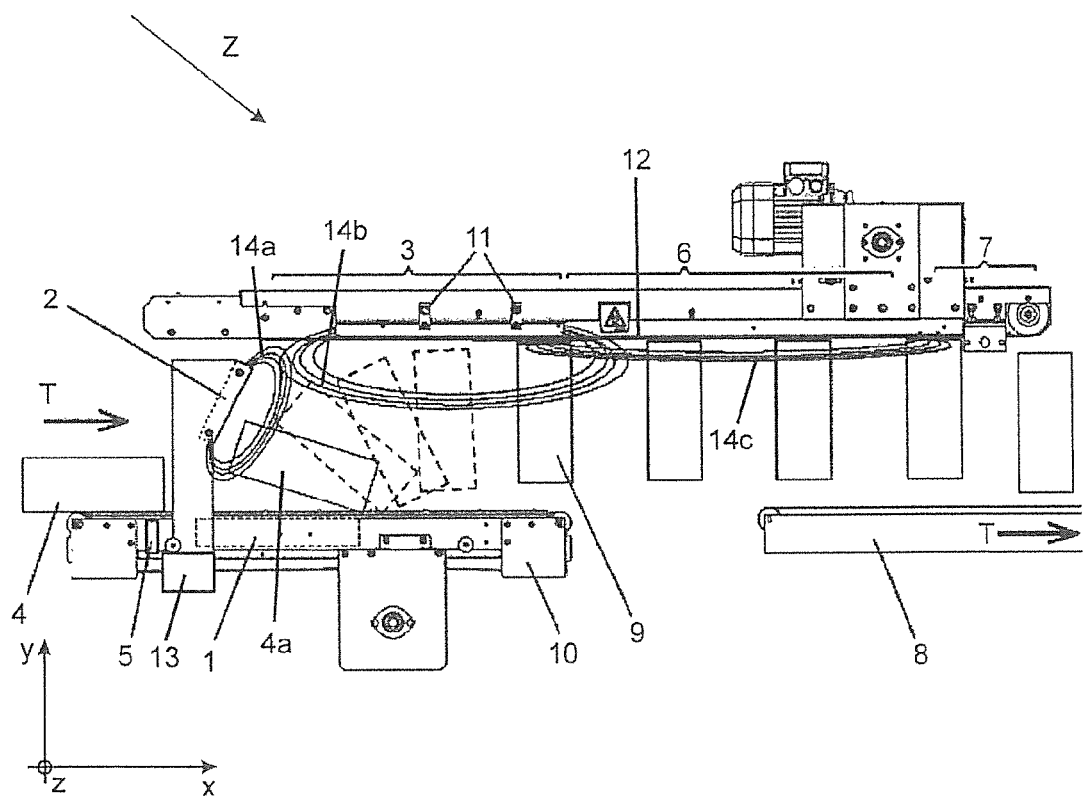
FIG. 1 shows a schematical side view of a body lifting device according to the invention.

Different references to the bodies shall illustrate the different states of the bodies with respect to their orientation to an input transport device 10 (FIG. 1). According to this, lying bodies are denoted by reference 4, lifted (standing) bodies and bodies which are transported in a magnetically hanging way are denoted by reference 9 and bodies in a transition phase between the lying and the lifted state are denoted by reference 4a.

The term "releasable" in the context of a magnet means here that the magnetic field strength of the magnet has such a value that the body located in the influence field of this magnet is liftable by a predefined exterior force or that it is not present. Correspondingly, the term "holding" means that the magnetic field strength of the magnet has such a value that the body located in the influence field of this magnet is not liftable by the predefined exterior force. In this context the term "deactivated" means with respect to magnets not only a complete turn off or removal of the magnet, but it may also signify only an at least partial screening (in case of permanent magnets) or a current reduction (in case of electromagnets). Correspondingly, the term "activated" means with respect to magnets not only a turn on or insertion of the magnet, but it may also signify an at least partial removal of screening (in case of permanent magnets) or a current augmentation (in case of electromagnets).

The term "height" of a body refers to the vertical dimension of the body in lifted (standing) state.

A "magnet case" is a case accommodating at least a magnet, particularly multiple magnets, in a special spatial arrangement.

A "magnet arrangement" may comprise only one or multiple magnets in the context of this document.

A "lifting space" is defined in the present context as the space where the body is transferred from the lying state in the magnetically hanging lifted state.

For simplicity reasons of the spatial description a coordinate system is drawn in the FIGS., with an x-axis corresponding to a transport direction T of the bodies, a y-axis corresponding to the vertical direction, and a z-axis being perpendicular onto the x-axis and pointing into the drawing plane.

The term "above the input transport direction" or "above an area of the input transport direction" is understood in the present context in such a way that an object to which this term refers has no or little offset in z-direction with respect to the input transport direction.

Figure 2:
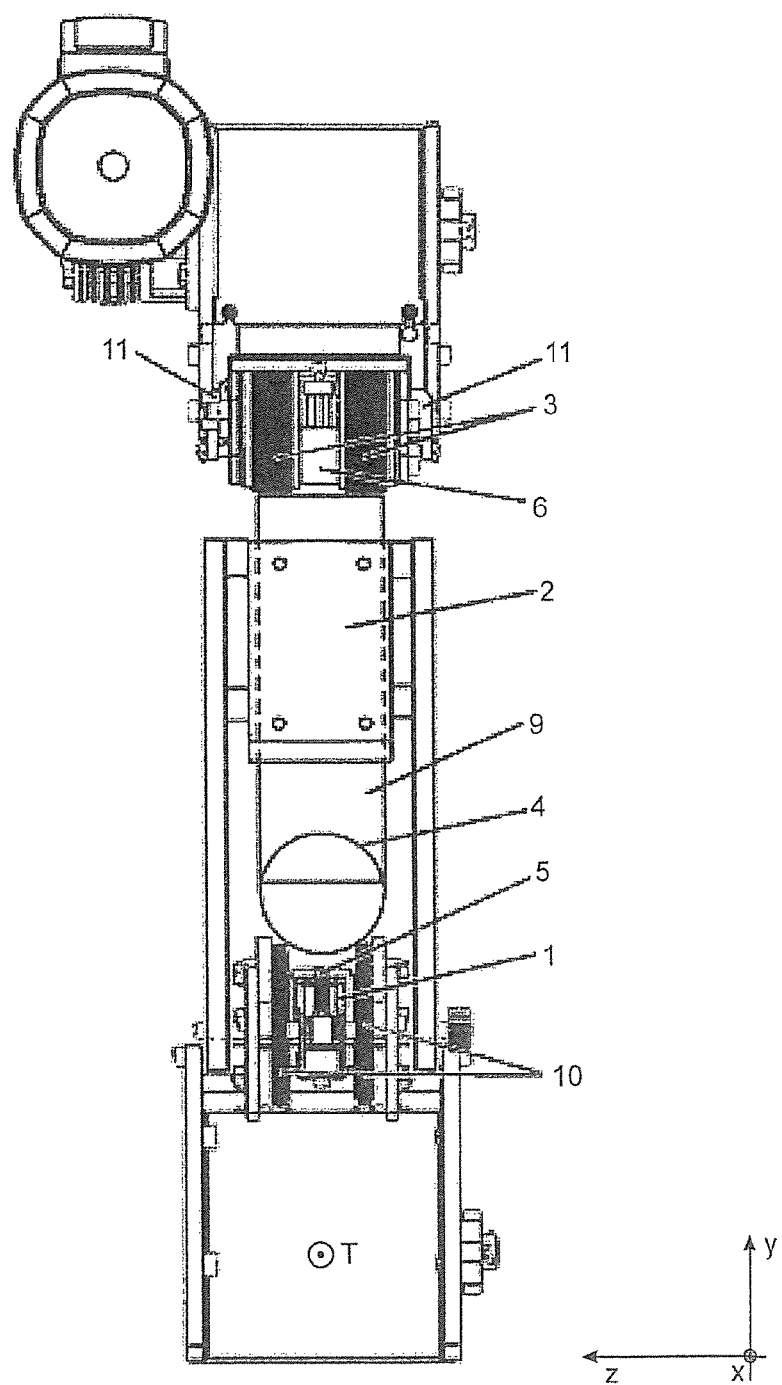
FIG. 2 shows the body lifting device of FIG. 1 viewed in transport direction.

FIGS. 1 and 2 show an embodiment of the invention in a simplified illustration. A body lifting device is used for manufacturing metal cans in case in which lifting cans 4 transported in a lying manner is necessary. The welded can bodies normally exit the respective installation entities after covering the welded seam with a coating and are lifted for further processing. For lifting, the lifting direction is defined as follows: lifting rear section: the can rotates about the front edge.

FIGS. 1 and 2 show a preferred embodiment of a body lifting device Z. The following description refers to both FIGS. because they show the same embodiment, however showing two different perspectives because of clarity reasons. In the shown embodiment of FIG. 1 lying can bodies enter the body lifting device Z from the left side and exit it to the right side in the direction of arrow T. The body lifting device Z comprises an input transport device 10, onto which the lying bodies 4 enter a lifting space of the lifting device Z, a transport device 12 which transports already lifted bodies 9 magnetically hanging and a transport device for further transportation 8 which transports the lifted bodies to further processing modules.

The input transport device 10 comprises a double-tracked transport band for transporting the lying bodies 4. In this way a precise supply of the lying bodies 4 into the lifting space is made possible.

The transport device for further transportation 8 may be part of the body lifting device Z, as described in the present embodiment, or it may be part of a subsequent module which takes over the bodies from the transport device 12.

The input transport device 10 and the transport device for further transportation 8 are e.g. transport bands known to the skilled person, as they are knowingly used in installations for manufacturing can bodies.

The transport device 12 may also be formed as transport band and may comprise actuating means, deflecting rollers and supporting rollers equally known to the skilled person. A magnet arrangement 6 is furthermore arranged above the transport device 12 (called fourth magnet arrangement), which is preferably formed as single-tracked permanent magnet or permanent magnet band 6, respectively, but which may also be formed in other ways; e.g. the permanent magnet band may also be double-tracked. Particularly, an electromagnet may also be used. The magnetic field generated by the permanent magnet 6 exerts an attracting force onto the lifted bodies, which is high enough to hold the bodies 9 in a hanging way at the transport band of the transport device 12. The single-tracked permanent magnet 6 extends above the transport device for further transportation 8 up to a body release position 7 where the magnetically hanging lifted bodies 9 are delivered to the transport device for further transportation 8. The delivery may be carried out in such a way that the lifted bodies simply fall onto the transport band of the transport device for further transportation 8 or they may be laid onto it in a controlled way by means of measures not described here but known to the skilled person.

In FIG. 1 the lifting of the lying container bodies 4 by means of the lifting device Z is shown by tilting about the front edge or the front rim, respectively, of the can body 4. Actuation means like motors, deflecting rollers and support rollers are only partially shown, however they are known to the skilled person.

Multiple magnet arrangements act in the lifting process, which are described in detail in the following.

As mentioned, the body 4 enters the lifting space in a lying state and is held on the transport band of the input transport device 10 by means of a first magnet arrangement 1. The first magnet arrangement 1 is formed by at least an electromagnet which holds in activated state the lying body 4 on the input transport device 10 and in deactivated state releases the lying body 4.

A second magnet arrangement 2 is formed by at least a permanent magnet, in this example formed by a plate which is arranged in an inclined way transversally to the transport direction. Generally, the second magnet arrangement 2 is arranged in such a way that it forms along its extension in z-direction transversally to the transport direction T, x a substantially constant angle $\alpha$ with respect to the vertical direction y, with $0 \leq \alpha \leq 90°$. In other words, the second magnet arrangement 2 is oriented transversally to the transport direction T (z-direction) and is inclined in transport direction T, x by the angle α with respect to the yz-plane. Preferably, a distance of a lower extremity of the second magnet arrangement 2 from the input transport device 10 and/or the angle α is/are adjustable. In this way the body lifting device Z may be adjusted to bodies of different sizes. If for example lying bodies with a larger diameter enter the device, the second magnet arrangement 2 may be lifted or it may be lowered, respectively, in case of bodies with smaller diameter. The adjustment of inclination (angle α) is helpful for adjusting the flight trajectory of the body 4a during lifting.

A third magnet arrangement 3 is formed as double-tracked permanent magnet rail. It is arranged above the input transport device 10 and the transport device 12. Preferably, a distance between the tracks of the permanent magnet rail 3 corresponds to a body diameter. A gauge adjustment device 11 (see FIG. 2) may be provided, by means of which the distance is adjustable. This increases flexibility of the body lifting device Z with respect to a secure, and preferably centered, reception of the lifted body 9 in case of different body diameters.

It is noted that all magnets declared permanent magnets within the scope of the described embodiment of the body lifting device Z may also be electromagnets. In this case a control device 13, which will be described in more detail in the following, takes over the task of coordinating activation or deactivation, respectively, of the individual magnets.

It is however also possible, even if not preferred because of the high complexity, to form the first magnet 1, which is defined as electromagnet here, as a permanent magnet, wherein in this case its activation or deactivation, respectively, is again carried out by means of the control device 13 and potential actuation means, by means of a more or less pronounced magnetic screening of the magnet in direction of the bodies 4, 4a, 9. Elements made of Supra 50 or Supra 60 or μ metal are used in this case.

In the following the operation of the body lifting device Z is described, particularly with respect to the processes occurring inside the lifting space.

The lifting device Z comprises a sensor 5 for detecting the incoming, lying body 4, wherein the sensor 5 sends position data of the lying body to the control device 13. The sensor may e.g. be formed as light barrier sensor, but other ordinary and usable sensor types may also readily be used.

The sensor 5 detects the arrival of a lying body, particularly an arrival of the front edge of the body 4, and transmits a corresponding signal to the control device 13. The control device 13 activates the electromagnet 1, such that the lying body 4 is held on the input transport device 10 while it is transported further, arriving below the permanent magnet 2. As soon as the trailing edge of the lying body 4 has passed the permanent magnet 2, the electromagnet 1 is deactivated, such that the trailing edge of the lying body 4 is captured by the magnetic field of the permanent magnet 2 and lifted as a result. FIG. 1 shows a snapshot of the lifting process after the electromagnet has been deactivated and body 4a is only exposed to the magnetic field of the permanent magnet 2. Field lines of this magnetic field are schematically shown with reference 14a.

Deactivation of electromagnet 1 is carried out delayed with respect of an activation instant, depending on a transport speed and a height of the body 4. The instant of deactivation is calculated by the control device 13 based on the previously detected input instant of body 4 into the lifting space. Depending on the arrangement of the sensor 5 due to construction, it may also be used for detecting the trailing edge of body 4, if it can be arranged directly below the permanent magnet 2. In this way the detection of the edges may directly be used for activation or deactivation, respectively, of the electromagnet 1. This is advantageous because the height of the body and the transport speed don't have to be known. A further solution in this respect may comprises two sensors, wherein a sensor serves for detecting the front edge and a sensor is used for detecting the trailing edge.

Because of the lifting of the trailing edge of body 4a, the trailing edge arrives in the influence area of the double-tracked permanent magnet rail 3 and is further lifted, until the body 4a is lifted off the input transport device 10. The body 4a describes on the one hand a translatory motion in transport direction T because of inertia and on the other hand a vertical motion, now primarily due to the influence of the magnetic field of the double-tracked magnet rail 3 (the influence of permanent magnet 2 decreases progressively with increasing distance of body 4a from it). The overlapping of these motions yield the flight trajectory of body 4a (shown dashed) shown in FIG. 1. Field lines of the magnetic field of the double-tracked magnet rail 3 are shown schematically with reference 14b. As can be seen in the figure in case of the most inclined dashed illustration of body 4a, the trailing edge is exposed to the magnetic fields 14a and 14b and enters progressively into the area of influence of magnetic field 14b, this being illustrated by the other two dashed illustrations of body 4a. Finally, body 4a is lifted and is transported further by the transport device 12 in a magnetically hanging way. Magnetic field lines of the permanent magnet 6 responsible for this are shown schematically by the field lines 14c.

The magnetically hanging body 9 is then delivered to the transport device for further transportation 8 in the manner discussed above.

While there are shown and described presently preferred embodiments of the invention, it is to be distinctly understood that the invention is not limited thereto but may be otherwise variously embodied and practiced within the scope of the following claims. Terms used in the description, such as "preferred", "especially", "advantageous", etc. only refer to optimal and exemplary embodiments.

The invention claimed is:

1. A magnetic lifting device for bodies (Z), comprising an input transport device (10) for transporting lying bodies (4), a transport device (12) for transporting lifted bodies (9) hanging at the transport device (12), arranged above the input transport device (10), and a control device (13), wherein a first magnet arrangement (1) which is activated and deactivated by the control device (13) is arranged below the input transport device (10) in such a way that a body (4) lying on the input transport device (10) is magnetically held in a releasable way on the input transport device (10), wherein a second magnet arrangement (2) is arranged above an area of the input transport device (10), into which the bodies are transported, and is formed in such a way that a body lying on the input transport device (10) is lifted by the magnetic field of the second magnet arrangement (10) when the magnetic field of the first magnet arrangement (1) is deactivated, wherein a third magnet arrangement (3) is provided above the transport device (12) and is formed and arranged in such a way that a partially lifted body (4a) is lifted more and is lifted off the input transport device (10) and is transported in an upright position hanging magnetically at the transport device (12), and wherein the control device (13) is adapted to activate the first magnet arrangement (1) when a front edge of a body (4) lying on the input transport device (10) has passed the second magnet arrangement (2) and to deactivate the first magnet arrangement (1) when a trailing edge of this body (4) comes to lie below the second magnet arrangement (2).

2. The magnetic lifting device according to claim 1, wherein the first magnet arrangement (1) is formed by at least an electromagnet which holds the lying body (4) on the input transport device (10) in activated state and releases the lying body (4) in deactivated state.

3. The magnetic lifting device according to claim 1, wherein the second magnet arrangement (2) is formed by at least a permanent magnet.

4. The magnetic lifting device according to claim 1, wherein the second magnet arrangement (2) is oriented transversally with respect to the transport direction (T) and is inclined in transport direction (T, x) by an angle ($\alpha$) with respect to a vertical transversal plane (yz), wherein $0 \leq \alpha \leq 90°$, particularly wherein a distance of a bottom extremity of the second magnet arrangement (2) from the input transport device and/or the angle ($\alpha$) is or are, respectively, adjustable.

5. The magnetic lifting device according to claim 1, wherein the third magnet arrangement (3) is formed as double-tracked permanent magnet rail.

6. The magnetic lifting device according claim 5, wherein a distance between the tracks of the permanent magnet rail (3) substantially corresponds to a diameter of the body, particularly wherein the distance is adjustable by means of a path gauge adjustment device (11).

7. The magnetic lifting device according to claim 1, wherein at least a sensor (5) for detecting the incoming lying body (4) is provided, wherein the sensor (5) transmits position data of the lying body (4) to the control device.

8. The magnetic lifting device according to claim 7, wherein the deactivation of the first magnet arrangement (1) is carried out delayed with respect to an activation instant depending on a transport speed and a height of the body.

9. The magnetic lifting device according to claim 1, wherein a fourth magnet arrangement (6), particularly formed as single-tracked permanent magnet, is provided for transporting the lifted bodies (9) magnetically hanging and follows the third magnet arrangement (3), wherein the fourth magnet arrangement (6) extends above a transport device for further transportation (8) up to a body release position (7) where the magnetically hanging lifted bodies (9) are delivered to the transport device for further transportation (8).

10. The magnetic lifting device according to claim 1, wherein the input transport device (10) comprises a double-tracked transport band for transporting the lying bodies (4).

11. A device for manufacturing can bodies with at least a magnetic lifting device (Z) according to claim 1.

12. A method for lifting bodies (4) comprising:
providing the magnetic lifting device (Z) according to claim 1; and
using the magnetic lifting device (Z) for lifting bodies (4) with a length to diameter ratio of 3 to 1.

* * * * *